United States Patent [19]

Spano et al.

[11] Patent Number: 5,587,879
[45] Date of Patent: Dec. 24, 1996

[54] MOUNTING ARRANGEMENT FOR COMPUTER HARDWARE COMPONENTS AND METHOD

[75] Inventors: Joseph M. Spano, North Reading; Robert S. Antonuccio, Burlington; James M. Carney, Pepperel, all of Mass.

[73] Assignee: Sun Microsystems, Inc., Mountain View, Calif.

[21] Appl. No.: 218,500

[22] Filed: Mar. 28, 1994

Related U.S. Application Data

[63] Continuation-in-part of Ser. No. 187,991, Jan. 28, 1994, Pat. No. 5,481,431.
[51] Int. Cl.$^6$ ............................. H05K 5/00; H05K 7/00
[52] U.S. Cl. ............................. 361/685; 361/683
[58] Field of Search ........................... 361/685, 683; 360/137 D, 137

[56] References Cited

U.S. PATENT DOCUMENTS

| 4,964,017 | 10/1990 | Jindrick et al. | 361/390 |
| 5,124,855 | 6/1992 | Dew et al. | 360/97.02 |
| 5,136,466 | 8/1992 | Remise et al. | 361/391 |

Primary Examiner—Leo P. Picard
Assistant Examiner—Phuong T. Vu
Attorney, Agent, or Firm—Matthew Rainey

[57] ABSTRACT

The disclosed invention relates to a computer system, including a crib device and chassis for installing and removing a hard drive to and from the chassis of the system. The drive is securable to the crib device, which has a handle that allows the drive to be carried to and away from the chassis. The crib device and chassis have cams and cam engaging surfaces that cause the crib device and drive to move to effect engagement and disengagement of the electrical connectors of the computer system and drive. Also disclosed is a mounting arrangement for a floppy disk drive and CD-ROM drive.

9 Claims, 6 Drawing Sheets

MOUNTING ARRANGEMENT FOR COMPUTER HARDWARE COMPONENTS AND METHOD

BACKGROUND OF THE INVENTION

This application is a continuation-in-part application of U.S. patent application, Ser. No., 08/187,991 filed Jan. 28, 1994, now U.S. Pat. No. 5,481,431, Entitled "CRIB DEVICE FOR COMPUTER HARD DRIVE OR THE LIKE", Inventors, Hassan Siahpolo, et al.

The present invention relates to an improved computer system, including an arrangement that allows the safe, quick and effortless installation, engagement, disengagement and removal of a hard drive or the like of the system and a method of manufacturing the arrangement and the assembly of the system and IC the devices thereof.

In most, if not all, computer systems, where space is always a high priority, the handling of the relatively heavy hard drive is a serious problem requiring great care to avoid damaging the drive, both in the initial installation thereof and in the later performance of maintenance. This is particularly true in the critical handling and positioning of the drive for electrical connection to the computer system. Because hard drives can not be subject to any great amount of stress or shock, it is highly desirable to find a way to safely handle the drives when installing them and in their removal from the computer systems. In the past, the heavy very expensive hard drives have been handled by hand and fastened to the computer chassis by hand tool tightened screws.

Another important consideration in installing and removing the drive is to find away that allows the use of a slotted or plug-in electrical connection system, wherein the drive can be connected to the system without the need of the use of hands or tools, or the extra step or steps represented thereby. Also, in past designs, the connection of the drive in a slotted or plug-in design required a considerable force to effect the electrical connection and disconnection, which in many cases because of the location of the drive in the computer system made it very difficult and time consuming to apply the necessary force required to effect the connection and disconnection.

Some of the same and different problems exist in present day designs for floppy disk drives, CD-ROM, tape drives and other computer components. In one prior design such disk drives were provided with wheel-like mounted grommets that were inserted in pedestals mounted on the floors of chassis and had portions that extended outwardly of the pedestals. The drives were held in place by legs provided in the inside of the covers of the cases that fit into the pedestals and which had portions that wedged against an associated grommet. This prior design while providing an effective mounting and securement arrangement for certain chassis designs, was not found acceptable for other chassis designs. Also the prior design involved the use of extra parts, fasteners and fixtures and related assembly time, which also were Involved in the prior mounting design for CD-ROM drives.

Any device or system that answers these objectives should be low in cost and high in reliability, in addition to reducing the number of required parts and reducing the installation and removal time and cost.

BRIEF DESCRIPTION OF THE INVENTION

The present invention meets each of the aforesaid requirements as relating to a hard drive by providing an improved computer system, including a user friendly crib arrangement for installing a hard drive element or the like of a computer system. The crib arrangement allows the safe, quick and effortless installing and, if desired, removal of an element to and from the system and one that allows the use of an electrical plug-in connector, where no tool force and very little hand force is required to effect the electrical connection and where the required force is applied in a very convenient manner.

More particularly, the invention provides an improved computer system, including a crib device and a method of manufacture and assemblage designed to be received in a chassis of the computer, the chassis having elongated openings that receive holding and guiding elements provided on the crib device. The openings also provide a mechanical mechanism, such as for example, cam engaging surfaces adapted to be contacted by cams of the crib device, through which action the crib device and a hard drive that has been secured thereto can be moved in reverse directions by an actuator that may take the form of a handle to which the cams are made a part, the leverage effect of the handle and cams providing the required force to engage and disengage the drive to and from a slotted connector with very little effort. The employment of a handle in this manner allows for the safe, quick and inexpensive handling of the hard drive to and from the chassis and the ability to connect and disconnect the electrical connection with a minimum of hand force and without any need to use tools.

The present invention also provides a mounting and securing arrangement for floppy disk drives, CD-ROM drives and other internal hardware elements of a computer. Included in this arrangement is the employment of grommets or the like mounted on the drives and adapted to fit into openings formed in walls of the chassis in a self containing manner, and which requires no additional parts or time in installing or removing. In this arrangement the drive can be installed and removed without the use of fasteners, fixtures or tools or the removal of other parts. Nor does the arrangement rely on the cooperation of other parts, such as the cover of the case, to maintain the drive in a secured position in the case.

DETAIL DESCRIPTION OF THE INVENTION

Figure 1:
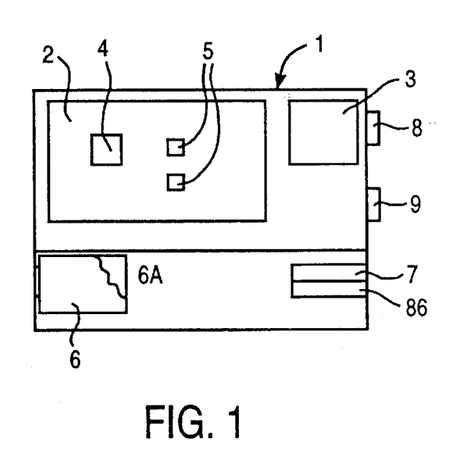
FIG. 1 is a schematic plan view, with the top part removed, of an improved computer system incorporating a crib device according to the present invention.

With reference to FIG. 1, there is illustrated in outline form an improved computer system according to the present invention, including along with other customary components and circuits, a computer box 1, a motherboard 2, a power supply unit 3, a CPU unit 4, two memory units 5, hard drive 6 having a printed circuit board 6A, a floppy disk drive 7 and input and output facilities 8 and 9, all these units being well known in the art.

Figure 2:
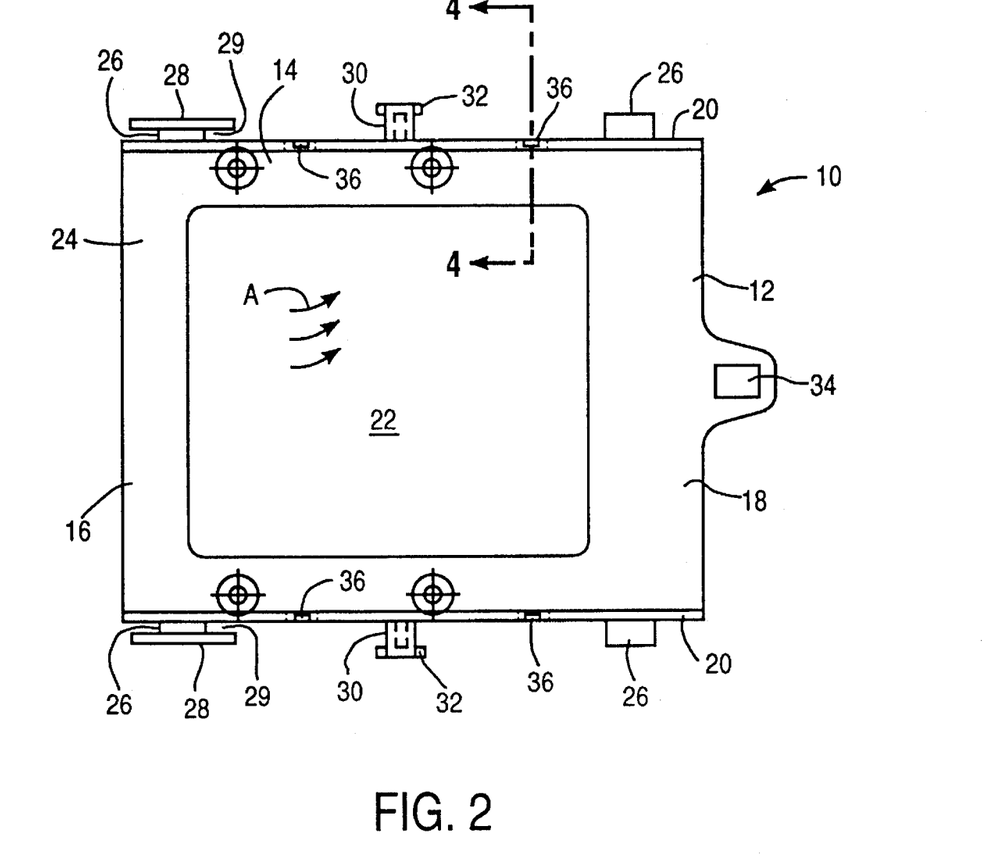
FIG. 2 is a plan view of a crib device illustrating the base portion thereof without its handle.
Figure 3:
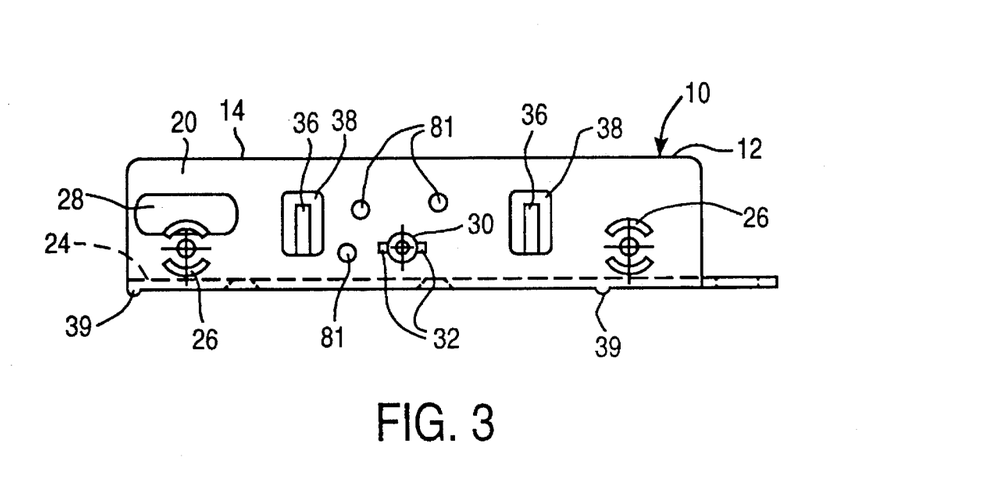
FIG. 3 is an elevational view of the base portion shown in FIG. 2.
Figure 4:
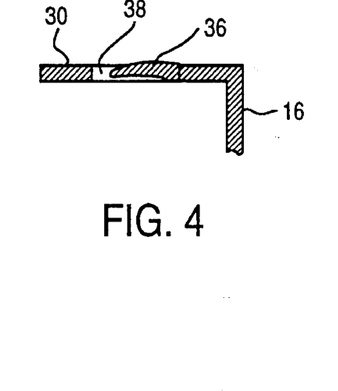
FIG. 4 is a section view taken on line 4—4 of FIG. 2.

The system includes a crib device 10 illustrated best in FIGS. 2, 3 and 4. The crib device 10 consist of a generally rectangularly shaped box 12 having, as one views FIGS. 2 and 3, an open top 14 and two opposed open ends 16 and 18. On the two longitudinal sides of the box 12 there are provided identical upright members or walls 20 that extend the full length of the box. The substantial opening 22 formed in the bottom 24 of the box is provided to reduce its weight and allow air flow cooling access for the bottom of the hard drive, the air flow being indicated by the legend A in FIG. 2. As noted above, the bottom of the hard drive has a customary printed circuit board 6A with its usual electrical components.

On the outside of each upright member 20 there are formed two spaced apart support and retention members 26 shaped, as best shown in FIG. 3, as segments of cylinders with the segments being arranged at the top and bottom and separated by spaces at the 3 and 9 o'clock positions. The members 26 are located near the ends 16 and 18 of the box 12. The members 26 at the end 16 of the box 12 is provided with brackets 28 that are mounted on the outer ends of the associated two members 26 to form spaces 29 between the adjacent portions of the upright members 20. As noted in FIGS. 2 and 3, the brackets extend parallel to the upright members 20 on either side of the support members 26.

Midway between the ends 16 and 18 on the outside of the walls 20 there are formed two in line spaced apart trunnion members 30 having cylindrical portions that project outwardly from the associated walls. The outer ends of the trunnion members 30 are provided with two diametrically oppositely arranged narrow projections 32. At the end 18 of the box 12 formed in the bottom 24 is a latch opening 34. The two walls 20 of the box 12 are provided with deflectable fingers 36, best shown in FIGS. 3 and 4. To form these fingers the walls 20 are provided with upright rectangular openings 38 with portions of the walls unremoved extending from the lower ends of the openings and terminating short of the upper ends of the openings thus forming the upwardly extending fingers 36. As best shown in FIG. 4, portions of the outer surfaces of the fingers 36 project beyond the adjacent surfaces of the walls 20 of the box 12, allowing the fingers 36 to be deflected inwardly when contacted by outside surfaces.

In referring to FIG. 3, on the outside surface of the bottom 24 below the walls 20 and at the very end on the left, as one views this figure, and inward from the opposite end, there are provided four feet 39, two being shown in FIG. 3. These feet provide frictional reducing sliding surfaces, as will be noted below, and aid in air flow for cooling the hard drive by providing a space between the floor 65 of the chassis or a crib device arranged below. It will be obvious to a skilled person in the art that the box 12 may take other forms, for example, a simpler form than described above, such as consisting of a single base member.

Figure 5:
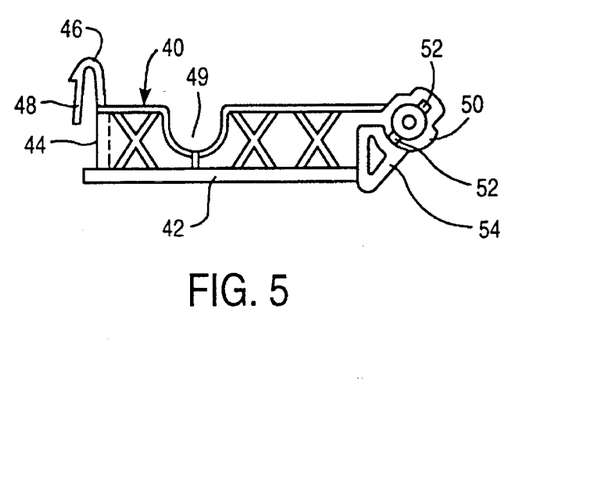
FIG. 5 is a plan view of a handle used but shown apart from the base portion of the crib device shown in FIGS. 2 and 3.
Figure 6:
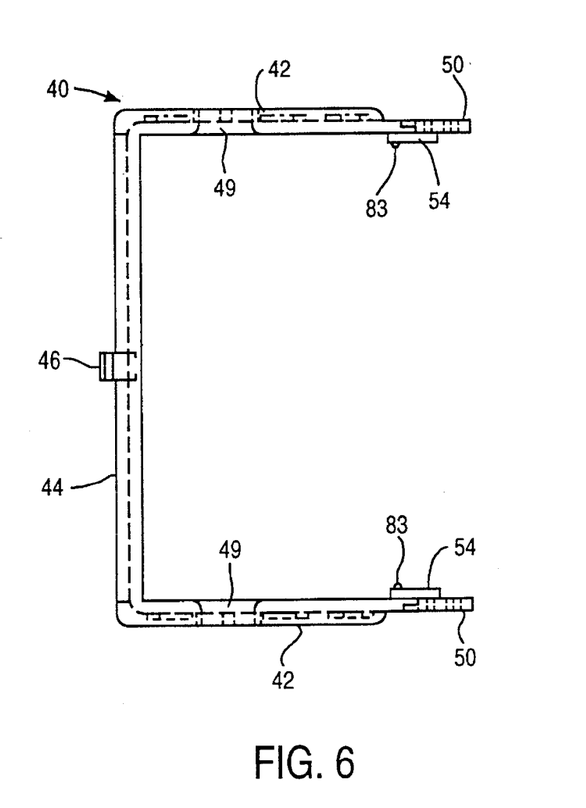
FIG. 6 is an elevational view of the handle shown in FIG. 5.

With reference now to the handle that is attached to the box 12, reference is made to FIGS. 5 and 6. The handle 40 consist of two identical arms 42 which are connected at their one ends by a cross member 44, which cross member at its upper surface is provided with a latch 46 in the form of an inverted U shaped member having an outer free collapsible end 48. Also at the latch end of the arms 42, the arms have circular recesses 49 facing the bottom of the arms designed to pass over adjacent support members 26 of the box 12. At the extreme inner end of each arm, the arms are provided with bosses 50 having openings that slide over the trunnion members 30 of the box 12, the bosses each having diametrically opposite slots 52 that slide over the projections 32 of the box 12. By this construction, the handle 40 is pivotally connected to the box and allowed to rotate from an upright carrying position, to a horizontal latching position and to two positions on either side of the carrying position, which are designated the forward and rearward crib device moving positions.

The distance of the separation of the arms 42 and the axial dimension of the bosses 50 are such that the inside of the arms are separated from the walls 20 of the box 12 sufficient to allow cam elements 54 to be arranged inside the arms 42 and the vertical outside surfaces of the walls 20. In this construction, while the handle 40 is free to rotate there will exist no play or transverse movement of the handle relative to the box 12 due to the restraining action of the fingers 36. The two cam elements 54 are identically formed in the general shape of a triangle, in which when the handle 40 is in its vertical most position, i.e. its carrying position, the cam elements 54 present two upper rounded cam surfaces 56 separated by one of the sides of the triangle, these surfaces being better shown in FIGS. 7 and 8. The cam surfaces 56 form first parts of two cam mechanisms.

It will be appreciated that while two cam elements are employed in the preferred embodiment, if desired, a single cam element 54 may be employed. It will also be apparent to those skilled in the art that other forms of an actuator can be used instead of the handle design illustrated, for example, a single lever arranged in several different ways can be used. As will be more apparent later, the leverage effect of the throw of the cam elements 54 and the length of the arms 42 are designed to allow the effortless movement of the crib device 10 when engaging and disengaging the hard drive, two such drives being shown only in FIGS. 7 and 8 at 6 and 6A.

The box 12 is dimensioned to permit the placement of a standard hard drive into the box 12 where it may be secured to the box by either screwless fastening facilities or by screws. In the design being illustrated, a hard drive lying flat against the bottom 24 of the box 12 is secured to the crib device 10 by four screws 58 passed through openings provided in the support and retention members 26 and into cooperative threaded holes, not shown, in the hard drive, two of the screws being shown only in FIG. 7. With other hard drives the screw connection may be made from the bottom of the drive or the drive may be secured to the crib device in some other manner. The crib device being illustrated is designed for a hard drive measuring approximately 5 ¾"×3 ¾"×1" which as noted above may be considered one of several standard sizes of drives in use today in desk top computer systems. While the invention for illustration purposes is used with a hard drive, it will be appreciated that the crib device may be employed to handle other elements of the computer system, such as a floppy disk drive.

The crib device 10 described above is designed to be made out of a polymer material, although it can be made of metal, such as an aluminum alloy. The choice of the material will depend on cost, environment, ergonomic and performance considerations.

Figure 7:
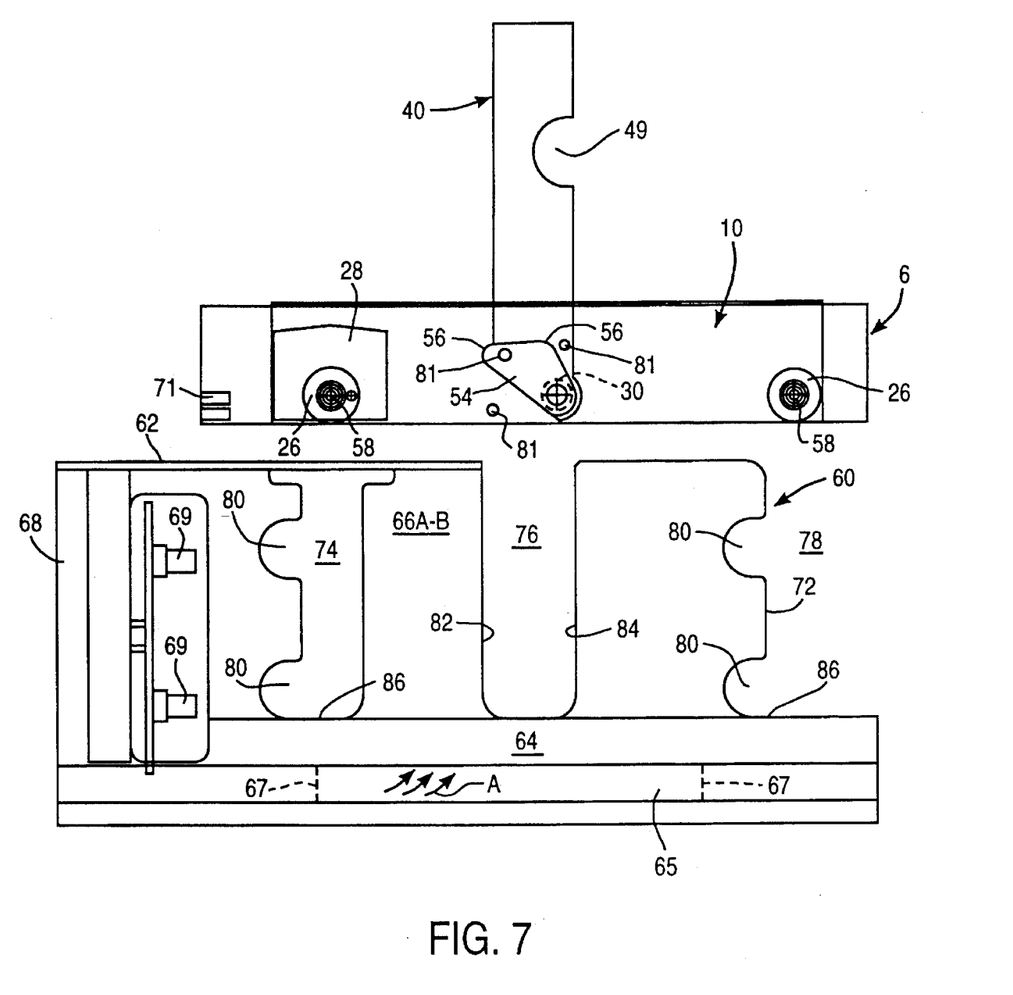
FIG. 7 is an elevational view, simplified in certain respects, of a chassis of a computer system illustrating a crib device and hard drive supportable by the handle above the chassis in position to be lowered into the chassis, FIGS. 8, A, B, C and D, are four schematic elevational views illustrating four related, but different, positions assumed by the crib device relative to the chassis of a computer system, in installing the crib device with a hard drive in the chassis and moving the drive into a slotted electrically connecting position.
Figure 8A:
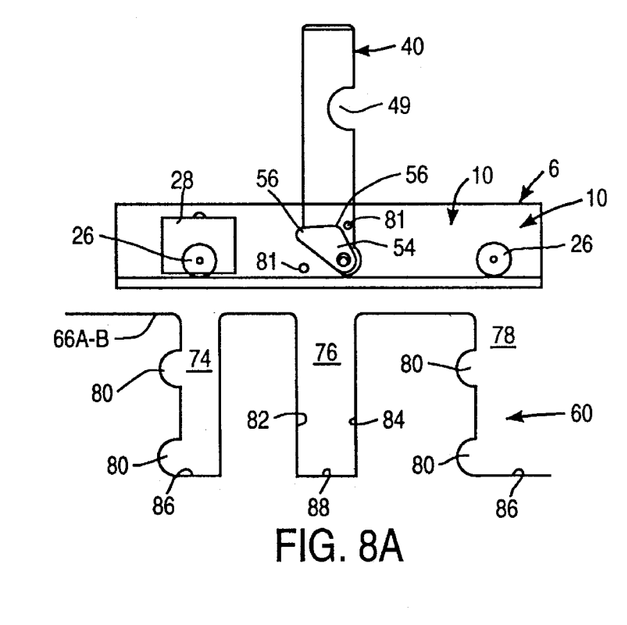
Figure 8B:
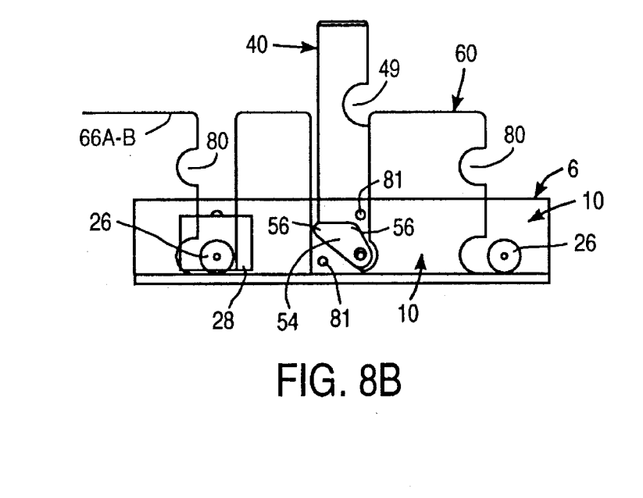

In referring now to the chassis 60 designed to cooperate with the crib device 10, reference is made to FIGS. 7 and 8A–8D. Particularly in FIG. 7, there is illustrated the left end of a chassis 60, which while only one side and a portion of its back wall are shown, it will be understood that the chassis takes the form of a box like structure that makes up a small part of the composite computer box or chassis. The chassis 60 has an open top 62, a bottom 64, which is joined and supports two upright walls 66A, one of which is only shown but the other indicated as 66B in the figures. The bottom 64 includes a flat sheet metal floor 65, which is provided with an opening, indicated by surfaces 67 shown in FIG. 7, located below the opening 22 of the crib device 10 and sized to allow air flow cooling of the hard drive, the air flow being indicated by the legend A in FIG. 7. One end of the chassis has a back wall 68 on which a slotted or plug-in electrical connector 69 is mounted and over and into which the matching connector 71 of the hard drive 6 is forced into. These connectors are of the type well known in the computer industry. In FIG. 7, two electrical connectors 69 are shown. The opposite end 72 of the chassis is open.

As best shown in FIG. 8A, each side of the walls A and B which are identically constructed, have three vertically arranged openings, 74, 76, and 78, reading left to right, the openings 74 and 78 each have a set of two vertically spaced recesses 80, the lower and upper recesses of one set being in horizontal alignment and sized to loosely receive the support and retention members 26. This alignment assures that the electrical connector of the hard drive will be on the proper plane for registry with the electrical connector of the computer system. The openings 78 in both walls 66A and B are actually formed by the open end of the chassis 60. The openings 76 in the walls 66A and B have straight vertical cam contacting cooperating sides or surfaces 82 and 84 that form second parts of the two cam mechanisms. While in the preferred form, the cams are formed on the cam elements 54, they may be formed on the chassis 60, in which case they would engage straight surfaces formed on the handle 40.

The openings 74 and 78 have bottom supporting edges 86, (see FIGS. 7 and 8A) and are contacted in a supporting relationship with the retention members 26, while the bottoms of the openings 76 are held out of contact with the bottoms of the trunnions 30 of the box 12 due to their smaller outside diameters relative to the trunnions 30. As is customary of the chassis is formed out of relatively heavy gauge steel sheet metal.

As shown in FIG. 3, the front wall 20 of the box 12 of the crib device 10 is provided with three holes 81 arranged on a common arc. The back wall 20 is provided with only two similar holes corresponding to the two upper most holes 81. As shown in FIG. 6, on the inside vertical surface of both of the cam elements 54 there are provided projecting buttons 83 arranged to pass through the aforesaid arc. The lower most single hole 81 when entered into by the button 83 is used to register the projections 32 of the trunnions 30 with the openings 52 of the arms 42, to aid in the assembly of the handle 40 on the trunnions 30 of the box 12. The holes 81 at the 11 o'clock position, as one views FIG. 3, are provided to hold the handle 40 in its carrying and inserting and removing positions, when they receive the buttons 83 to assist in the quick and easy installing and removing of the crib device and hard drive. The remaining holes 81 are provided to relieve any stress on the handle 40 that may occur when the handle is latched due to the stress placed on the handle by the latching action.

In briefly describing the operation of the improved computer system, including the crib device 10 and chassis 60 and their assemblage, with the top, not shown, of the computer system removed allowing immediate access to the hard drive chassis 60, a crib device 10 is inserted into the openings 76 of the chassis. Before this is done, a hard drive 6 will have been secured to the crib device 10 by screws 58. The thickness of the bottom 24 of the crib device and the height of the opening 67 of the chassis are such that the outer surfaces of the lowest most components of the printed circuit board of the hard drive are prevented from contacting the floor 65 of the chassis. During this phase, the handle 40 is used to carry the drive with the handle in its vertical position, as shown in FIGS. 7 and 8A. In this position, the two cam elements 54 assume the laid back positions so that they can pass unrestrictedly into the openings 76 of the walls 66A and B of the chassis 60. When lowering the crib device, the support and retention members 26 will be received by the openings 74 and 78 and come to rest on the surfaces 86 of the chassis directly in front of and in proper registry with the two sets of lower recesses 80 thereof associated with the openings 74 and 78.

Figure 8C:
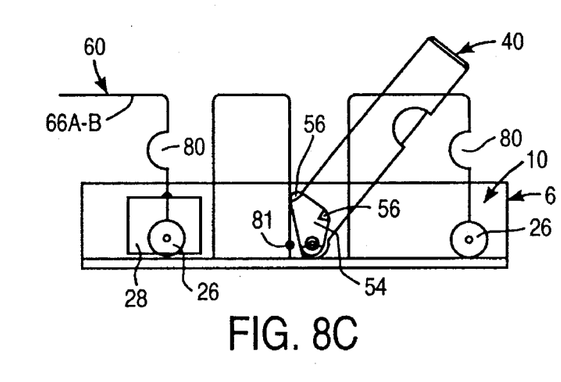
Figure 8D:
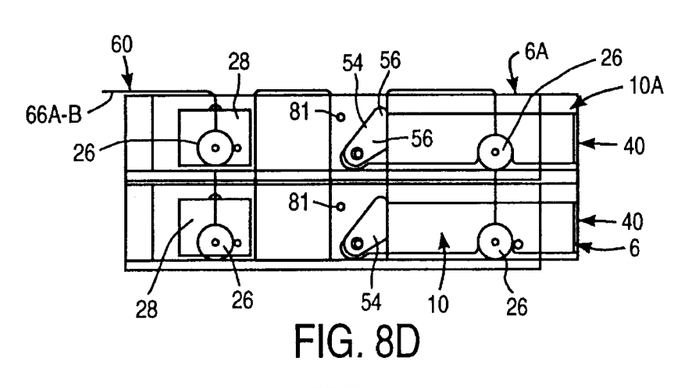

The crib device 10 will be guided and held in the proper position during its downward movement by the fact that the brackets 28 arranged at the front of the crib device will slide over the overlapped portions of the walls 66A and B, of the chassis 60, in which the walls 20 of the crib device will be held between the brackets 28 and the walls 66A and B. As noted above, the brackets 28 not only control the downward movement of the crib device but also its longitudinal movement. In this regard, it will be observed that in all three positions represented by FIGS. 8B, C and D the brackets 28 are always in an overlapping condition relative to the walls 66A and B of the chassis 60.

During the downward movement of the crib device 10, the four fingers 36 will engage and be deflected inwardly as they contact the inside surfaces of the chassis walls 66A and B, thus preventing transverse movement of the crib device and the secured hard drive. After this very simple and quick operation, the handle 40 can be rotated from its carrying vertical position clockwise, as one views FIGS. 7 and 8B and 8C, to the position it is shown to assume in FIGS. 8C and D. This action will cause the forward most cam surfaces 56 of the cam elements 54 to contact the wall surfaces 84 of the walls 66A and B forcing the crib device and hard drive to the left on one views FIGS. 7 and 8. This movement will require very little force which may be applied by a single finger.

The controlled restraining of the crib device by virtue of the edges 86, the recesses 80, the brackets 28 and fingers 36 will assure unhesitated entrance of the connector 71 of the hard drive with the connector 69 of the computer system. In the connected position, the latch 48 of the handle 40 will pass into the latch opening 34 of the box 12, latching the crib device and the hard drive in the chassis 60, and firmly holding these interconnected units against any movement relative to the chassis, due to the locking of the cam elements 54 against the surfaces 84 of the chassis and the restraining action of the fingers 36. Also in this position, the circular recesses 49 of the arms 42 will pass over the adjacent support members 26.

In removing the hard drive and crib device, the above procedure is reversed. In this case, the frontward most cam surfaces 56 will engage the vertical surfaces 82 of the openings 76 as the handle is rotated counterclockwise, by the same small force required to engage the connectors, as shown in FIG. 8C, for example. This will create the necessary force to disengage the connectors 69 and 71 and retract the crib device 10 and hard drive 70 to the position shown in FIG. 8B, where the handle can be used to quickly and easily lift the drive out of the chassis 60. While the above description contemplates employment of the crib device 10 to both install and remove a drive, the crib device may in certain applications be employed only to effect the installation of the drive.

In the applications where it is desirable to employ two or more hard drives in the computer system, the design illustrated in FIGS. 7 and 8 will accommodate this interest. In these figures the heights of the walls 66A and B of the chassis 60, and openings 74, 76 and 78, as well as providing second sets of recesses 80 and extended cam surfaces 82 and 84 allow a second hard drive 6A to be stacked and supported above a first drive 6. In this construction, the four feet 39 of the second crib device 10A will come to rest on the upper edges of the walls 20 of the lower crib device 10 and act as sliding surfaces for the upper crib device 10A and its drive 6A, and also provide the air flow cooling advantage, noted above, by virtue of the separation between the two crib devices. The upper surfaces or edges of the walls 20 of the lower crib device 10 provide straight continuous supporting and guiding surfaces for the feet 39 of the upper crib device 10A. The walls 20 and hence the feet 39 being located inside the walls 66A and B of the chassis 60 allow the feet of the upper crib device 10A to ride over the walls 20 of the lower crib device 10.

Figures 9, 10:
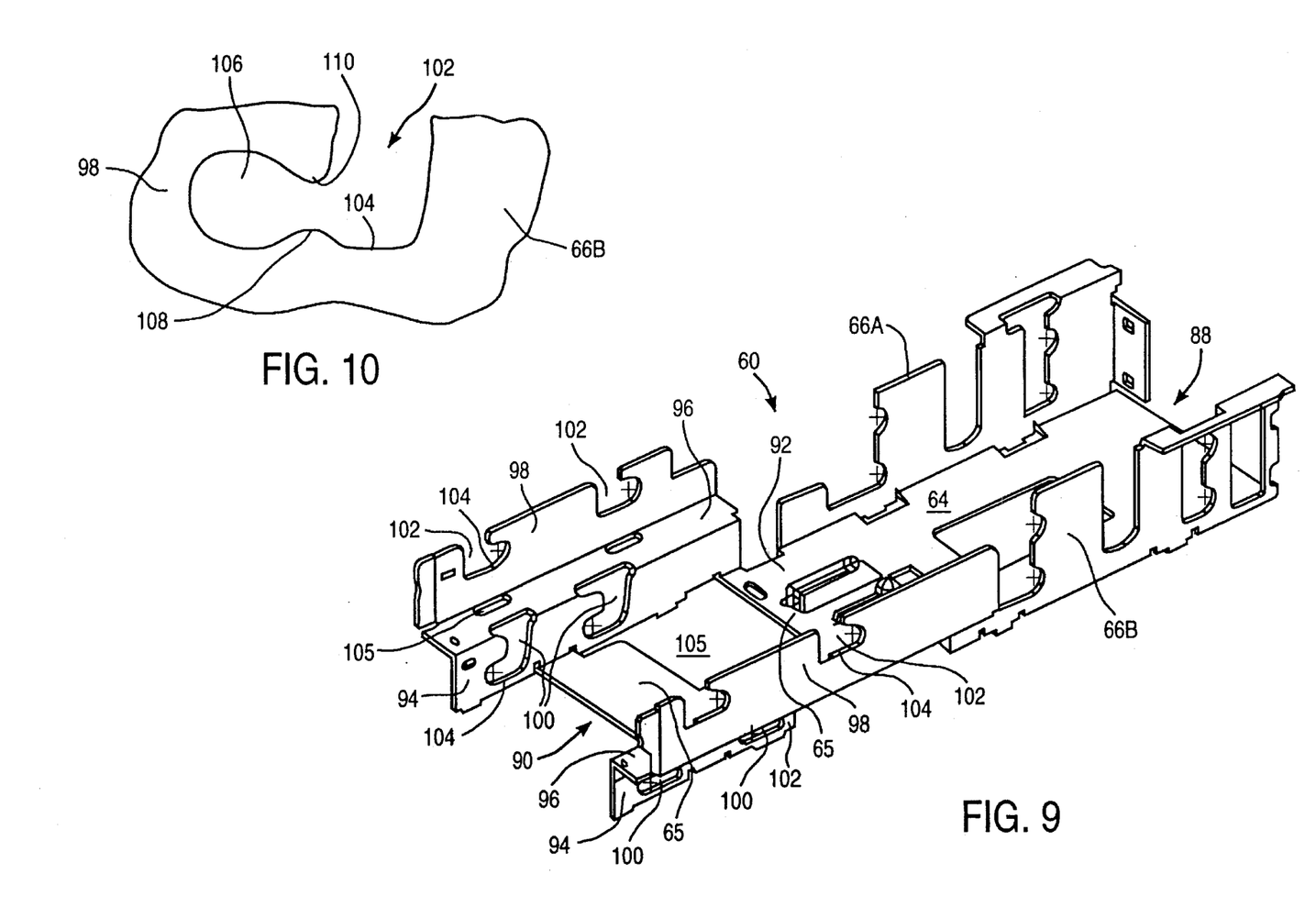
FIG. 9 is a second embodiment of the invention and illustrates in an isometric view a portion of the chassis of the computer designed to receive several drives in a two part bay area formed in the chassis.
FIG. 10 is an enlarged partial elevational view of one of the holding openings formed in the left end bay shown in FIG. 9.

Turning now to the second embodiment of the invention, FIG. 9 illustrates the left and right hand ends of the chassis 60 designed to receive the drives of the computer box 1. As noted in FIG. 1, adjacent one side of the chassis the hard drive 6 is located at the one end and the floppy disk drive 7 at the opposite end of the chassis. Also shown schematically at 86 is a representation of a CD-ROM drive. FIG. 9 indicates that the drive receiving area of the chassis 60 is divided into two bays 88 and 90. The former receives the hard drive 6 at the right and the latter the floppy disk drive 7 and CD-ROM drive 86 at the left. The bottom 64, its floor 65 and the upright walls 66A and 66B are separated by a transition portion 92, the floor portion 65 of which supports part of the electrical system and connectors for the drives 7 and 86, and while in this area the wall 66B differs slightly from wall 66A the remaining portions of the walls 66A and 66B of the bay 90 are identical, except for being opposite hand.

Each parallel wall 66A and 66B in the bay 90 has three flat integral sections 94, 96 and 98, each section being made up of two identical transversely spaced parts. The sections 94 are connected to the floor 65 and have pairs of spaced openings 100. The openings 100 have lower horizontal portions joined by vertical portions, which at their upper ends are formed into second horizontal portions, the latter portions being formed in the sections 96 of the walls. The lower horizontal portions of the openings 100 point in the direction to the left and the openings are arranged to form two spaced apart directly opposed pairs of cooperative openings.

In the wall sections 98 two additional spaced apart directly opposed pairs of openings 102 are provided. These openings are located above the openings 100 a vertical distance to accommodate the height dimension of the CD-ROM drive and have horizontal portions that extend in the opposite direction when compared with the horizontal openings 100. The horizontal surfaces and the closed ends of the openings 100 and 102 are identically constructed. The walls 66A and 66B being made up of relatively heavy gauge steel sheet metal provide support surfaces 104. The openings 105 in the wall sections 96 and floor 65 are provided for air circulation for the drives.

FIG. 10 illustrates more of the details of one of the openings and its lower horizontal surface 104 and closed end 106. At the entrance of the closed end 106 and directly below the front end of the opening, where it is at its narrowest, there is provided a slightly raised portion 108, shown exaggerated, which has the effect of closing the mouth of the opening a desired amount. The lower surface 108 has a cooperating similar surface 110, the two surfaces creating an interference fit for a grommet, not shown, mounted on the drives.

Figures 11, 12:
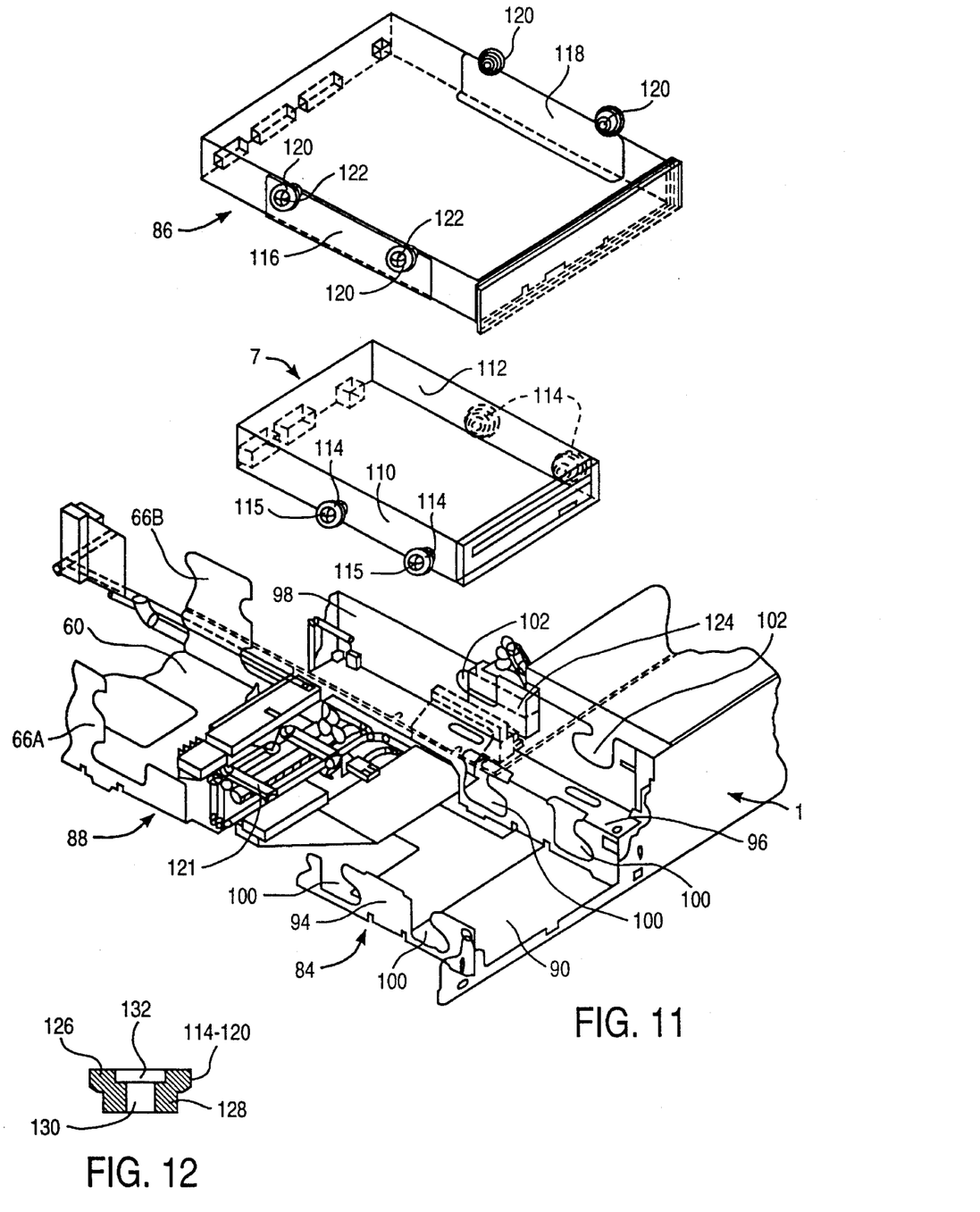
FIG. 11 is an isometric expanded view of the left end bay shown in FIG. 9, along with a showing of a floppy disk drive and a CD-ROM drive, spaced from the bay but with broken line indications of their operative positions in the bay.
FIG. 12 is an elevational view of one of the grommets mounted on the drives shown in FIG. 11.

In FIG. 11 the chassis bay 90 is again illustrated along with the floppy disk drive 7 and CD-ROM drive 86. The floppy disk drive is received in the lower portion of the bay 90 formed by the wall sections 94 and 96 and in the two pairs of openings 100 formed therein. The floppy disk drive 7 is a well known design, and on its two opposite long sides 110 and 112 two pairs of grommets mounting, holding and yieldable members or 114 are mounted, the grommets being spaced to fit into a different one of the openings 100. The grommets are secured to the vertical sides of the disk drive by screws 115 attached to the sides. As seen from FIG. 10, in mounting the drive into the openings 100, the grommets are adapted to slide into the vertical sections until they reach the bottom of the openings, after which the drive is moved to the right towards the front of the chassis 60 to lock the drive to the chassis.

The CD-ROM drive 86 is mounted directly above the floppy disk drive, which is also of a well known design and on its opposite long sides 116 and 118 pairs of grommets 120, similar to the grommets 114 are mounted, the grommets being spaced to fit into a different one of the openings 102. The grommets are secured to the sides 116 and 118 by screws 122 that attach to the sides. In mounting the drive 86 in the chassis 60 the operation is as described above with the floppy disk drive, except in the case of the CD-ROM drive it is moved to the left or towards the back of the chassis. FIG. 11 indicates at 122 and 124 some of the electrical elements and connectors for the two stacked drives.

One of the grommets 114 and 120 is shown in FIG. 12 and comprises a one piece unit having an enlarged front cylinderical mounting portion 126 contactable with an associated outside surface of one of the walls 66A or 66B and a rear cylinderical portion 128, both portions having a common hole 130, the hole being countersunk at 132 to receive one of the screws 115 or 120. The grommets can be one of several types of copolyester elastomer, for example, of the type sold by the General Electric Company under the registered trademark "LOMOD".

In the illustrated example of the grommets, the diameter of the portion 128 is approximately 13 mm and the interference fit 108–110 is approximately 12.45 mm. The rear portions 128 of the grommets are sized to slide easily into the vertical portions of the openings 100 and 102 until they reach the bottoms of the openings. At this point, the portions 128 of the grommets are urged through the interference fits until they contact the backs of the openings. This use of the grommets as mounting and holding devices and the use of the compressing surfaces formed by the interference fits prevent the drives from becoming dislodged, in an arrangement that does not requires any other parts, fasteners or figures or cooperation with other elements to accomplish the result. More particularly, the interference fit is employed to compress the material of the portion 128 of the grommet a desired amount, which material has been selected so that its elastic characteristic will after released from the fit expand against the compressing surface of the closed end 106 of the opening 100–102 to create a self sustaining holding force sufficient to firmly secure the drive to the chassis. The compression and release is achieved by only a hand urging in moving the drives into and out of the openings 100 and 102.

In briefly explaining the mounting of the floppy and CD-ROM drives 7 and 86, respectively with the top of the box 1 removed exposing the bays 88 and 90, the floppy drive is placed in the openings 100 as explained above, and connected by hand to its electrical components 121. After this, the CD-ROM drive can be arranged above the floppy drive by placing it in the openings 102 as noted above, and connected by hand to its electrical components 124. This will place the receiving slot of the floppy drive in a desired position to be exposed to the front side of the box 1 and in a position to receive a floppy disk.

In like manner, the CD-ROM drive will have its slide end exposed to the usual opening provided in the front side of the box 1 allowing the slide to move outwardly to receive a media. In both cases of the drives, the openings are located and dimensioned to place the front ends of the drives in the desired positions relative to the front side of the box 1.

In accordance with the provisions of the patent statutes, we have explained our invention in terms of its preferred embodiment, however, it will be readily understood by those skilled in the art to which the invention pertains that it may be practiced otherwise than illustrated and described.

We claim:

1. A mounting arrangement for a computer having a drive unit or the like, comprising:

a chassis having an area for receiving said drive unit, said area including a support member for said drive unit, said support member having an opening having a compressing surface, said drive unit including a mounting and holding member, said mounting member including a yieldable portion being constructed and arranged to be received in said opening and placed in contact with said compressing surface in a manner to compress said yieldable portion of said mounting member an amount to create a holding force sufficient to secure said drive unit to said support member, said support member of said area comprising a platform and spaced walls projecting outwardly from said platform, said opening formed in each of said walls, a said mounting member for each opening, each said mounting member comprising a grommet formed of a copolyester elastomer, said support member comprises two said walls, said walls connected to said platform in a manner to extend generally perpendicularly therefrom and having an opposed spaced apart relationship to each other sufficient to permit said drive unit to be received between said opposed walls for connection thereto, each said walls having two longitudinally spaced apart said openings arranged to form opposed cooperative pairs of openings, said drive unit having two opposed sides arranged generally parallel to said walls, each said side of said drive unit having mounted thereon two spaced apart said grommets constructed and arranged so that associated portions thereof are received in a different one of said openings of said walls, said walls and openings being constructed and arranged to permit said drive unit to be at least substantially received within the confines of said walls, each said portion of an associated grommet arranged to project outwardly from said sides of said drive unit and adapted to be secured to said sides of said walls, each said opening is formed with a first and second extending portion, each said portion of said opening being arranged so that a said portion of an associated grommet is received first by said first portion of an associated said opening and then by said second portion thereof, each said first portion having an area arranged to allow a said portion of an associated grommet to pass freely through said first portion, each said second portion being arranged generally perpendicularly to an associated first portion and having a front part and a back part, each said front part having a reduced open area forming an associated said compressing surface to compress a said portion of an associated grommet to create said holding force of a said portion of an associated grommet, each said back part being enlarged relative to an associated front part for receiving a said portion of an associated grommet after passing through an associated front part, the enlargement being such that said compressed said portion of an associated grommet after passing through an associated front part will possess said holding force with said chassis, each said grommet being cylindrical in shape in which an associated portion thereof is arranged adjacent to an associated side of said drive unit and a second portion thereof is spaced from an associated said side, each said spaced portion of said grommets having a larger diameter than an associated adjacent portion thereof, and each said grommet being constructed and arranged relative to an associated opening to place an associated adjacent portion in an associated opening.

2. A mounting arrangement according to claim 1, wherein said computer includes a system board, a CPU and a memory unit, and wherein said drive unit is either a hard drive, a floppy disk drive or CD-ROM drive.

3. A mounting arrangement for a computer having a drive unit or the like, comprising:

a chassis having an area for receiving said drive unit, said area including a support member for said drive unit, said support member having an opening having a compressing surface, said drive unit including a mounting and holding member, said mounting member including a yieldable portion being constructed and arranged to be received in said opening and placed in contact with said compressing surface in a manner to compress said yieldable portion of said mounting member an amount to create a holding force sufficient to secure said drive unit to said support member, said support member of said area comprising a platform and spaced walls projecting outwardly from said platform, said opening formed in each of said walls, a said mounting member for each opening, each said mounting member comprising a grommet formed of a copolyester elastomer, said support member comprises two said walls, said walls connected to said platform in a manner to extend generally perpendicularly therefrom and having an opposed spaced apart relationship to each other sufficient to permit said drive unit to be received between said opposed walls for connection thereto, each said walls having two longitudinally spaced apart said openings arranged to form opposed cooperative pairs of openings, said drive unit having two opposed sides arranged generally parallel to said walls, each said side of said drive unit having mounted thereon two spaced apart said grommets constructed and arranged so that associated portions thereof are received in a different one of said openings of said walls, said walls and openings being constructed and arranged to permit said drive unit to be at least substantially received within the confines of said walls, each said portion of an associated grommet arranged to project outwardly from said sides of said drive unit and adapted to be secured to said sides of said walls, said two walls are constructed and arranged to form a first support station for a first said drive unit, said walls of said first support station having support portions arranged adjacent said platform, said two walls also constructed and arranged to form a second support station for a second said drive unit, said walls of said second support station having support portions constructed and arranged above said support portions of said first support station, and said support portions of said second support station being transversely spaced from said support portions of said first support station a distance to allow said grommets of said second drive unit to be mounted on said support portions of said second support portions directly above said first drive unit.

4. A mounting arrangement according to claim 2, wherein each said opening of said walls of said first and second stations is formed with a first and second extending portion, each said extending portion being arranged so that an associated grommet is received first by said first portion and then by said second portion, each said first extending portion of a said opening arranged to allow an associated grommet to pass freely through said first portion, each said second extending portion being arranged generally perpendicularly to an associated first extending portion and having a front part and a back part, each said front part having a reduced area constructed and arranged to compress an associated grommet to create said holding force of an associated grommet, each said back part being enlarged relative to an associated front part for receiving an associated grommet after passing through an associated front part, the enlargement being such that said compressed grommet after passing through an associated front part will possess said holding force with said chassis, each said grommet being cylindrical in shape and having a portion arranged adjacent to an associated side of an associated drive unit and a portion spaced from an associated side, each said spaced portion having a larger diameter than an associated adjacent portion, each said grommet being constructed and arranged relative to an associated opening to place an associated adjacent portion in an associated opening, said computer including a system board, a CPU and a memory unit, said drive units being either a hard drive, a floppy disk drive or CD-ROM drive, said computer having an entrance side for said drive units, said second extending portions of said openings of said first station pointing in the direction of said entrance side of said computer, and said second extending portions of said openings of said second station pointing in a direction opposite to said direction of said second extending portions of said first station.

5. A mounting arrangement for a computer having a drive unit or the like, comprising;

a chassis having an area for receiving said drive unit, said area including a support member for said drive unit, said support member having an opening having a compressing surface, said drive unit including a mounting and holding member, said mounting member including a yieldable portion being constructed and arranged to be received in said opening and placed in contact with said compressing surface in a manner to compress said yieldable portion of said mounting member an amount to create a holding force sufficient to secure said drive unit to said support member, said support member of said area comprising a platform and spaced walls projecting outwardly from said platform, said opening formed in each of said walls, a said mounting member for each opening, each said mounting member comprising a grommet formed of a copolyester elastomer, said support member comprises two said walls, said walls connected to said platform in a manner to extend generally perpendicularly therefrom and having an opposed spaced apart relationship to each other sufficient to permit said drive unit to be received between said opposed walls for connection thereto, each said walls having two longitudinally spaced apart said opening arranged to form opposed pairs of openings, said drive unit having two opposed sides arranged generally parallel to said walls, each said side of said drive unit having mounted thereon two spaced apart said grommets constructed and arranged so that associated portions thereof are received in a different one of said openings of said walls, said walls and openings being constructed and arranged to permit said drive unit to be at least substantially received within the confines of said walls, each said portion of an associated grommet arranged to project outwardly from said sides of said drive unit and adapted to be secured to said sides of said walls, said area of said chassis comprises two aligned spaced apart bays, each said bay having a said support member, each said support member comprising a said platform, said walls and said openings, at least a said drive unit for each bay, and one of said drive units having said grommets.

6. A mounting arrangement according to claim 5, wherein each said opening is formed with a first and second extending portions, each said extending portion being arranged so that an associated grommet is received first by said first portion and then by said second portion, each said first portion having an area arranged to allow an associated grommet to pass freely through said first portion, each said second portion being arranged generally perpendicular to an associated first portion and having a front part and a back part, each said front part having a reduced area constructed and arranged to compress an associated grommet to create said holding force of an associated grommet, each said back part being enlarged relative to an associated front part for receiving an associated grommet after passing through an associated front part, the enlargement being such that said compressed grommet after passing through an associated front part will possess said holding force with said chassis, each said grommet being cylindrical in shape in which an associated portion thereof is arranged adjacent to an associated side of said drive unit and a portion thereof is spaced from an associated said side, each said spaced portion of said grommet having a larger diameter than an associated adjacent portion thereof, each said grommet being constructed and arranged relative to an associated opening to place an associated adjacent portion in an associated opening, said computer including a system board, a CPU and a memory unit, and wherein said drive unit in said first bay is a hard drive and said drive unit in said second bay is either a floppy disk drive or CD-ROM drive.

7. A method of manufacturing a computer having a drive unit comprising the steps of:

forming a chassis with an area for receiving said drive unit, forming said area with a support member for said drive unit, forming said support member with an opening having a compressing surface, connecting to said drive unit a mounting and holding member, constructing and arranging said mounting member to include a yieldable portion to be received in said opening and placed in contact with said compressing surface in a manner to compress said yieldable portion of said mounting member an amount to create a holding force sufficient to secure said drive unit to said support member, forming said mounting member in the form of a grommet of a copolyester elastomer, forming said area of said chassis with a platform and two spaced walls projecting outwardly form said platform, connecting said walls to said platform in a manner to extend generally perpendicularly therefrom and having an opposed spaced apart relationship to each other sufficient to permit said drive unit to be received between said opposed walls for connection thereto, each said wall having two longitudinally spaced apart said openings, forming said openings to comprise opposed cooperative pairs of openings, arranging said walls to extend generally parallel to two opposed sides of said drive unit, mounting on each said sides of said drive unit two spaced apart said grommets in a manner so that associated portions thereof are received in a different one of said openings of said walls, forming said walls and openings in a manner to permit said drive unit to be at least substantially received within the confines of said walls, forming each said portion of an associated grommet to project outwardly from said sides of said drive unit in a manner that said grommets can be secured to said walls, forming each of said openings with a first and second extending portion in a manner that an associated grommet is received first by said first portion and then by said second portion, forming each said first portion to have an open area sufficient to allow an associated grommet to pass freely through said first portion, forming each said second portion to be arranged generally perpendicularly to an associated first portion and to have a front part and a back part, forming each said front part to have a reduced opening sufficient to compress an associated grommet to create said holding force of an associated grommet, forming each said back part to be enlarged relative to an associated front part for receiving an associated grommet after passing through said front part, the enlargement being such that said compressed grommet after passing through said front part will possess said holding force with said chassis, forming each said grommet to have a cylindrical shape in which an associated portion thereof is arranged adjacent to an associated side of said drive unit and a portion thereof is spaced from an associated side, forming each said spaced portion of a said grommet to have a larger diameter than an associated adjacent portion thereof, forming each said grommet relative to an associated opening to place said adjacent portion in an associated opening, mounting in said computer a system board, a CPU and a memory unit, and wherein said drive unit is either a hard drive, a floppy disk drive or CD-ROM drive.

8. A method according to claim 4, comprising the additional steps of:

forming said area of said chassis to include two in lined spaced apart bays, forming each said bay with a said support member, forming each said support member to include a said platform, said walls and said openings, and arranging at least a said drive unit in each said bay.

9. A method according to claim 4, comprising the additional steps of:

forming said platform and said two walls to form a first support station for a first said drive unit, forming said walls of said first support station to have support portions arranged adjacent an associated platform, forming said two walls to form a second support station for a second said drive unit, forming said walls of said second support station to have support portions arranged above said support portions of said first support station, and arranging said support portions of said second support station to be transversely spaced from said support portions of said first support station a distance to allow said second drive unit to be mounted directly above said first drive unit.

* * * * *